United States Patent
Chen et al.

(10) Patent No.: US 12,028,118 B2
(45) Date of Patent: Jul. 2, 2024

(54) ANTENNA CALIBRATION APPARATUS AND ANTENNA CALIBRATION METHOD

(71) Applicant: Huawei Technologies Co., Ltd., Shenzhen (CN)

(72) Inventors: Wei Chen, Shanghai (CN); Min Chen, Shanghai (CN); Kan Li, Shanghai (CN); Fang Chen, Shanghai (CN); Dezheng Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 311 days.

(21) Appl. No.: 17/682,861

(22) Filed: Feb. 28, 2022

(65) Prior Publication Data

US 2022/0182156 A1 Jun. 9, 2022

Related U.S. Application Data

(63) Continuation of application No. PCT/CN2019/103763, filed on Aug. 30, 2019.

(51) Int. Cl.
*H04B 17/00* (2015.01)
*H04B 17/11* (2015.01)
*H04B 17/21* (2015.01)

(52) U.S. Cl.
CPC ............. *H04B 17/11* (2015.01); *H04B 17/21* (2015.01)

(58) Field of Classification Search
CPC .... H04B 17/11; H04B 17/101; H04B 17/201; H04B 17/21; H04B 17/22; H04B 17/25
See application file for complete search history.

(56) References Cited

U.S. PATENT DOCUMENTS

| | | | |
|---|---|---|---|
| 2015/0124634 A1 | 5/2015 | Harel et al. | |
| 2016/0218428 A1* | 7/2016 | Jung | H04B 17/21 |
| 2017/0077602 A1* | 3/2017 | Li | H04B 1/10 |
| 2018/0316092 A1* | 11/2018 | Cai | H01P 5/185 |
| 2019/0268046 A1 | 8/2019 | Kim et al. | |

FOREIGN PATENT DOCUMENTS

| | | |
|---|---|---|
| CN | 1418028 A | 5/2003 |
| CN | 101335966 A | 12/2008 |
| CN | 101548479 A | 9/2009 |
| CN | 102520419 A | 6/2012 |
| CN | 204177963 U | 2/2015 |
| CN | 107248868 A | 10/2017 |
| CN | 108476035 A | 8/2018 |

(Continued)

*Primary Examiner* — Tuan Pham
(74) *Attorney, Agent, or Firm* — Leydig, Voit & Mayer, Ltd.

(57) ABSTRACT

This application provides an antenna calibration apparatus and an antenna calibration method. The antenna calibration apparatus includes: l antennas; l antenna filters, where first ends of the l antenna filters are respectively connected to the l antennas; l radio frequency links, respectively connected to second ends of the l antenna filters; and a calibration circuit, connected to each of the second ends of the l antenna filters, and configured to: send or receive a first calibration signal through a position between each antenna filter in the l antenna filters and a radio frequency link connected to the second end of each antenna filter; and calibrate each antenna based on the first calibration signal.

14 Claims, 3 Drawing Sheets

(56) References Cited

FOREIGN PATENT DOCUMENTS

| | | | |
|---|---|---|---|
| CN | 108540181 | A | 9/2018 |
| CN | 110166134 | A | 8/2019 |
| CN | 209232944 | U | 8/2019 |
| CN | 110178315 | B | 10/2020 |
| EP | 2053759 | B1 | 6/2011 |
| JP | 2005522062 | A | 7/2005 |
| JP | 2007304118 | A | 11/2007 |
| JP | 2008035286 | A | 2/2008 |
| JP | 2012109892 | A | 6/2012 |
| JP | 2019536362 | A | 12/2019 |
| JP | 2020507230 | A | 3/2020 |
| WO | 2018093176 | A3 | 8/2018 |
| WO | 2018137148 | A1 | 8/2018 |
| WO | 2018119153 | A3 | 3/2019 |
| WO | 2019161101 | A1 | 8/2019 |

\* cited by examiner

ANTENNA CALIBRATION APPARATUS AND ANTENNA CALIBRATION METHOD

CROSS-REFERENCE TO RELATED APPLICATIONS

This application is a continuation of International Application No. PCT/CN2019/103763, filed on Aug. 30, 2019, the disclosure of which is hereby incorporated by reference in its entirety.

TECHNICAL FIELD

This application relates to the communications field, and in particular, to an antenna calibration apparatus and an antenna calibration method in the communications field.

BACKGROUND

As wireless communication technologies are increasingly widely used, a multi-antenna technology has become one of key technologies for wireless transmission. When a signal is transmitted in a radio frequency channel, an amplitude and a phase of the signal change due to a nonlinear feature of the channel. Therefore, an antenna calibration function is designed. Multi-channel antenna calibration is intended to obtain amplitude and phase features of the radio frequency channel, to compensate for an amplitude and a phase of the radio frequency channel, so as to ensure amplitude consistency and phase consistency between transmitter channels as well as between receiver channels, and amplitude reciprocity and phase reciprocity between receiver channels and transmitter channels.

A position of a conventional antenna calibration coupling port is located between an antenna filter and the antenna, that is, located in an antenna feeder unit. An antenna calibration circuit is located in a radio frequency unit at which a radio frequency link is located. In this case, the antenna calibration circuit needs to be connected to the antenna feeder unit to receive or obtain a signal, and then connected to the radio frequency unit to process the signal. A link of the antenna calibration circuit needs to span the foregoing antenna feeder unit and the radio frequency unit, and one or more cables (or connectors) and a combiner unit need to be added. Consequently, there are more components required, an assembly technique is complex, and implementation costs are relatively high.

SUMMARY

This application provides an antenna calibration apparatus and an antenna calibration method, to simplify an assembly technique of the antenna calibration apparatus, and help reduce implementation costs of the antenna calibration apparatus.

According to a first aspect, an antenna calibration apparatus is provided. The apparatus includes: l antennas, where l is an integer greater than or equal to 2; l antenna filters, where first ends of the l antenna filters are respectively connected to the l antennas; l radio frequency links, respectively connected to second ends of the l antenna filters; and a calibration circuit, connected to each of the second ends of the l antenna filters, and configured to: send or receive a first calibration signal through a position between each antenna filter in the l antenna filters and a radio frequency link connected to the second end of each antenna filter; and calibrate each antenna in the l antennas based on the first calibration signal.

According to the antenna calibration apparatus in this embodiment of this application, a position of an antenna calibration coupling port is arranged between the antenna filter and the radio frequency link. This enables the calibration circuit to directly send or receive a calibration signal through a radio frequency unit to perform antenna calibration, without adding components such as a cable, a connector, and a combiner unit. This simplifies an assembly technique of the antenna calibration apparatus, and helps reduce implementation costs of the antenna calibration apparatus.

It should be understood that the antenna may also be referred to as an antenna element, a feeder antenna, or another name; an antenna channel may also be referred to as a channel or another name; and the calibration circuit may also be referred to as an antenna calibration circuit or another name. This is not limited in this embodiment of this application. It should be further understood that the antenna and the antenna filter belong to an antenna feeder unit, and the radio frequency link and the calibration circuit belong to the radio frequency unit. The antenna calibration coupling port is a connection port of the calibration circuit, and may also be referred to as an antenna calibration port or another name. In this embodiment of this application, a position of the antenna calibration coupling port of each antenna is between the antenna filter and the radio frequency link. In this way, the calibration circuit may send or receive the first calibration signal through the antenna calibration coupling port. In other words, the calibration circuit may send or receive the first calibration signal through the position between the antenna filter and the radio frequency link connected to the second end of the antenna filter. The first calibration signal is a calibration signal generated in a running process of a live network.

With reference to the first aspect, in some embodiments, the calibration circuit is specifically configured to: determine a first compensation parameter of each antenna;
  determine a second compensation parameter of each antenna based on the first compensation parameter and the first calibration signal; and
  calibrate each antenna based on the second compensation parameter.

It should be understood that, because the position of the antenna calibration coupling port is between the antenna filter and the radio frequency link, a signal sent or received by the calibration circuit may not pass through the antenna filter. An error (which may include, for example, a PCB cable error, a connector error, an antenna filter error, an antenna network error, or an antenna element error) of a link between the antenna and the antenna filter needs to be obtained through making a table in an equipment (equipment tabling). In other words, the equipment tabling is intended to compensate for inconsistency of hardware links. In a production process of the apparatus, signal measurement is performed, and an obtained compensation parameter is stored in a memory (for example, a memory) for subsequent calibration. In this embodiment of this application, the compensation parameter in the equipment tabling process is referred to as the first compensation parameter. However, it should be understood that the first compensation parameter may also be referred to as an equipment tabling compensation parameter or another name. This is not limited in this embodiment of this application. Once the apparatus is delivered, the first compensation parameter is already stored. In a possible implementation, the first compensation parameter is stored in the memory in a form of a table (for example, an equipment table). However, this is not limited in this embodiment of this application.

In an actual running process of the live network, the calibration circuit may obtain the first compensation parameter of each antenna from the memory, determine the second compensation parameter of each antenna based on the first compensation parameter and the first calibration signal obtained from the antenna calibration coupling port, and further calibrate the antenna by using the second compensation parameter. The second compensation parameter is a compensation parameter in the actual running process of the live network. The second compensation parameter may also be referred to as a calibration compensation parameter or another name. This is not limited in this embodiment of this application.

With reference to the first aspect, in some embodiments, the $i^{th}$ antenna in the l antennas is used as a reference antenna, and a first compensation parameter $\delta_j$ of the $j^{th}$ antenna in the l antennas meets:

$$\delta_j = \frac{1}{2}\left(\frac{a_i \times b_j}{a_j \times b_i} + \frac{c_i \times d_j}{c_j \times d_i}\right),$$

where a radio frequency link corresponding to the $j^{th}$ antenna includes a receiver link and a transmitter link, the receiver link is connected to a receiver module, the transmitter link is connected to a transmitter module, the $j^{th}$ antenna is connected to an antenna used for testing, $a_j$ represents a second calibration signal received by the receiver module and sent by the antenna used for testing, $b_j$ represents a second calibration signal received by the receiver module and sent by the calibration circuit, $c_j$ represents a second calibration signal received by the antenna used for testing and sent by the transmitter module, d represents a second calibration signal received by the calibration circuit and sent by the transmitter module, i is an integer and $1 \leq i \leq l$, and j is an integer ranging from 1 to l.

The second calibration signal is a calibration signal generated in the equipment tabling process. In the equipment tabling process, one or more equipment tabling antennas are required, which are also referred to as antennas used for testing in this specification. It should be understood that if there is only one equipment tabling antenna, a position of the equipment tabling antenna may be adjusted each time to sweep each antenna in the l antennas. In addition, one antenna needs to be selected from the l antennas as the reference antenna, to calculate an error between the reference antenna and another antenna. In this embodiment of this application, the $i^{th}$ antenna is the reference antenna.

With reference to the first aspect, in some embodiments, the first calibration signal includes $e_j$ and $f_j$, $e_j$ represents a calibration signal received by the calibration circuit and sent by a transmitter module corresponding to the $j^{th}$ antenna, and $f_j$ represents a calibration signal received by a receiver module corresponding to the $j^{th}$ antenna and sent by the calibration circuit; a second compensation parameter of the $j^{th}$ antenna includes a second compensation parameter $\tau_{T_j}$ of a transmitter link corresponding to the $j^{th}$ antenna and a second compensation parameter $\tau_{R_j}$ of a receiver link corresponding to the $j^{th}$ antenna; the $i^{th}$ antenna in the l antennas is used as the reference antenna, and the second compensation parameter $\tau_{T_j}$ of the transmitter link corresponding to the $j^{th}$ antenna in the l antennas meets:

$$\tau_{T_j} = \delta_j \times \frac{e_i}{e_j};$$

and
the second compensation parameter $\tau_{R_j}$ of the receiver link corresponding to the $j^{th}$ antenna in the l antennas meets:

$$\tau_{R_j} = \delta_j \times \frac{f_i}{f_j}.$$

In the actual running process of the live network, a receiver channel and a transmitter channel of the antenna need to be calibrated separately. Therefore, the first calibration signal may include the calibration signal $e_j$ corresponding to the transmitter link and the calibration signal $f_j$ corresponding to the receiver link. Correspondingly, the second compensation parameter may include the compensation parameter $\tau_{T_j}$ corresponding to the transmitter link and the compensation parameter $\tau_{R_j}$ corresponding to the receiver link. The second compensation parameter may be obtained through calculation based on the first compensation parameter and the first calibration signal.

With reference to the first aspect, in some embodiments, the calibration circuit is configured to: obtain the first calibration signal $e_j$ and $f_j$ corresponding to each antenna; determine, based on the first compensation parameter $\delta_j$ of each antenna and the first calibration signal $e_j$ corresponding to each antenna, a second compensation parameter $\tau_{T_j}$ of a transmitter link corresponding to each antenna; determine, based on the first compensation parameter $\delta_j$ of each antenna and the first calibration signal $f_j$ corresponding to each antenna, a second compensation parameter $\tau_{R_j}$ of a receiver link corresponding to each antenna; and
compensate for the transmitter link corresponding to each antenna with the second compensation parameter $\tau_{T_j}$ of the transmitter link corresponding to each antenna, and compensate for the receiver link corresponding to each antenna with the second compensation parameter $\tau_{R_j}$ of the receiver link corresponding to each antenna.

With reference to the first aspect, in some embodiments, the l antennas correspond to a first frequency band, and the antenna calibration apparatus further includes: k antennas, corresponding to a second frequency band, where k is an integer greater than or equal to 2; k antenna filters, where first ends of the k antenna filters are respectively connected to the k antennas; and k radio frequency links, respectively connected to second ends of the k antenna filters. The calibration circuit is connected to each of the second ends of the k antenna filters, and is configured to: send or receive a third calibration signal through a position between each antenna filter in the k antenna filters and a radio frequency link connected to the second end of each antenna filter in the k antenna filters, and calibrate each antenna in the k antennas based on the third calibration signal.

Similar to the first frequency band corresponding to the l antennas, in the case of the second frequency band, a position of an antenna calibration coupling port of each antenna in the k antennas is between the antenna filter and the radio frequency link. In this way, the calibration circuit may send or receive the third calibration signal through the antenna calibration coupling port. In other words, the calibration circuit 140 may send or receive the third calibration signal through the position between the antenna filter and the radio frequency link connected to the second end of the antenna filter. The third calibration signal is a calibration signal generated in the running process of the live network. For related descriptions of the k antennas in the second frequency band, refer to the descriptions of the l antennas in the first frequency band. Details are not described herein again.

With reference to the first aspect, in some embodiments, the calibration circuit is specifically configured to: determine a first compensation parameter of each antenna in the k antennas; determine a second compensation parameter of each antenna in the k antennas based on the first compensation parameter of each antenna in the k antennas and the third calibration signal; and calibrate each antenna in the k antennas based on the second compensation parameter of each antenna in the k antennas.

Similar to the first frequency band corresponding to the l antennas, in the second frequency band, equipment tabling also needs to be performed to obtain the first compensation parameter, and the first compensation parameter is written into the memory for subsequent calibration. In the second frequency band, an equipment tabling and calibration process of the k antennas is similar to the equipment tabling and calibration process in the first frequency band. Details are not described herein again.

According to the antenna calibration apparatus in this embodiment of this application, the assembly technique of the antenna calibration apparatus is simplified and the implementation costs of the antenna calibration apparatus are reduced. In addition, antenna calibration of a multi-band and multi-antenna channel can be implemented, and development costs are further reduced.

With reference to the first aspect, in some embodiments, a reference antenna used to determine the first compensation parameter of each antenna in the k antennas is the $q^{th}$ antenna in the k antennas, q is an integer, and $1 \leq q \leq k$.

It should be understood that, in the equipment tabling and calibration process, the reference antenna needs to be selected. Reference antennas in frequency bands are different herein. To be specific, in the first frequency band, the reference antenna needs to be selected from the l antennas corresponding to the first frequency band; in the second frequency band, the reference antenna needs to be selected from the k antennas corresponding to the second frequency band.

It should be further understood that a sequence of calibration processes of antennas in each of the frequency bands is not limited in this application. The calibration circuit may calibrate one antenna once obtaining a second compensation parameter corresponding to the antenna. Alternatively, after obtaining the second compensation parameters corresponding to all the antennas, the calibration circuit calibrates all the antennas together. This is not limited in this embodiment of this application.

According to a second aspect, an antenna calibration method is provided. The method is applied to an antenna calibration apparatus including l antennas. The l antennas are respectively connected to first ends of l antenna filters, and second ends of the l antenna filters are respectively connected to l radio frequency links and each connected to a calibration circuit. The method includes: obtaining a first calibration signal, where the first calibration signal is sent or received by the calibration circuit through a position between each antenna filter in the l antenna filters and a radio frequency link connected to the second end of each antenna filter; determining a first compensation parameter of each antenna in the l antennas; determining a second compensation parameter of each antenna based on the first compensation parameter and the first calibration signal; and calibrating each antenna based on the second compensation parameter.

With reference to the second aspect, in some embodiments, the $i^{th}$ antenna in the l antennas is used as a reference antenna, and a first compensation parameter $\delta_j$ of the $j^{th}$ antenna in the l antennas meets:

$$\delta_j = \frac{1}{2}\left(\frac{a_i \times b_j}{a_j \times b_i} + \frac{c_i \times d_j}{c_j \times d_i}\right),$$

where a radio frequency link corresponding to the $j^{th}$ antenna includes a receiver link and a transmitter link, the receiver link is connected to a receiver module, the transmitter link is connected to a transmitter module, the $j^{th}$ antenna is connected to an antenna used for testing, $a_j$ represents a second calibration signal received by the receiver module and sent by the antenna used for testing, $b_j$ represents a second calibration signal received by the receiver module and sent by the calibration circuit, $c_j$ represents a second calibration signal received by the antenna used for testing and sent by the transmitter module, $d_j$ represents a second calibration signal received by the calibration circuit and sent by the transmitter module, i is an integer and $1 \leq i \leq l$, and j is an integer ranging from 1 to l.

With reference to the second aspect, in some embodiments, the first calibration signal includes $e_j$ and $f_j$, $e_j$ represents a calibration signal received by the calibration circuit and sent by a transmitter module corresponding to the $j^{th}$ antenna, and $f_j$ represents a calibration signal received by a receiver module corresponding to the $j^{th}$ antenna and sent by the calibration circuit; a second compensation parameter of the $j^{th}$ antenna includes a second compensation parameter $\tau_{T_j}$ of a transmitter link corresponding to the $j^{th}$ antenna and a second compensation parameter $\tau_{R_j}$ of a receiver link corresponding to the $j^{th}$ antenna; the $i^{th}$ antenna in the l antennas is used as the reference antenna, and the second compensation parameter $\tau_{T_j}$ of the transmitter link corresponding to the $j^{th}$ antenna in the l antennas meets:

$$\tau_{T_j} = \delta_j \times \frac{e_i}{e_j};$$

and the second compensation parameter $\tau_{R_j}$ of the receiver link corresponding to the $j^{th}$ antenna in the l antennas meets:

$$\tau_{R_j} = \delta_j \times \frac{f_i}{f_j}.$$

With reference to the second aspect, in some embodiments, the obtaining a first calibration signal includes: obtaining the first calibration signal $e_j$ and $f_j$ corresponding to each antenna. The determining a second compensation parameter of each antenna based on the first compensation parameter and the first calibration signal includes: determining, based on the first compensation parameter $\delta_j$ of each antenna and the first calibration signal $e_j$ corresponding to each antenna, a second compensation parameter $\tau_{T_j}$ of a transmitter link corresponding to each antenna; and determining, based on the first compensation parameter $\delta_j$ of each antenna and the first calibration signal $f_j$ corresponding to each antenna, a second compensation parameter $\tau_{R_j}$ of a receiver link corresponding to each antenna. The calibrating each antenna based on the second compensation parameter includes: compensating for the transmitter link corresponding to each antenna with the second compensation parameter $\tau_{T_j}$ of the transmitter link corresponding to each antenna, and compensating for the receiver link corresponding to each antenna with the second compensation parameter $\tau_{R_j}$ of the receiver link corresponding to each antenna.

With reference to the second aspect, in some embodiments, the l antennas correspond to a first frequency band, and the antenna calibration apparatus further includes k antennas corresponding to a second frequency band, where k is an integer greater than or equal to 2, the k antennas are respectively connected to first ends of k antenna filters, and second ends of the k antenna filters are respectively connected to k radio frequency links and each connected to the calibration circuit. The method further includes: obtaining a third calibration signal, where the third calibration signal is sent or received by the calibration circuit through a position between each antenna filter in the k antenna filters and a radio frequency link connected to the second end of each antenna filter in the k antenna filters; determining a first compensation parameter of each antenna in the k antennas; determining a second compensation parameter of each antenna in the k antennas based on the first compensation parameter of each antenna in the k antennas and the third calibration signal; and calibrating each antenna in the k antennas based on the second compensation parameter of each antenna in the k antennas.

With reference to the second aspect, in some embodiments, a reference antenna used to determine the first compensation parameter of each antenna in the k antennas is the $q^{th}$ antenna in the k antennas, q is an integer, and $1 \leq q \leq k$.

According to a third aspect, a base station is provided, including the antenna calibration apparatus in any one of the first aspect or embodiments of the first aspect.

DESCRIPTION OF EMBODIMENTS

The following describes technical solutions of this application with reference to the accompanying drawings.

In embodiments shown below, "first", "second", "third" and various numbers are merely used for distinguishing for ease of description, and are not used to limit the scope of the embodiments of this application. For example, different signals and different parameters are distinguished. In addition, "including" and "having" and any variations thereof are intended to cover non-exclusive inclusion, for example, a process, method, system and product that include a series of steps or units, or other steps or units inherent to a device.

It should be understood that the technical solutions in the embodiments of this application may be applied to various communications systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, a new radio (NR) system, or another evolved communications system.

Figure 1:
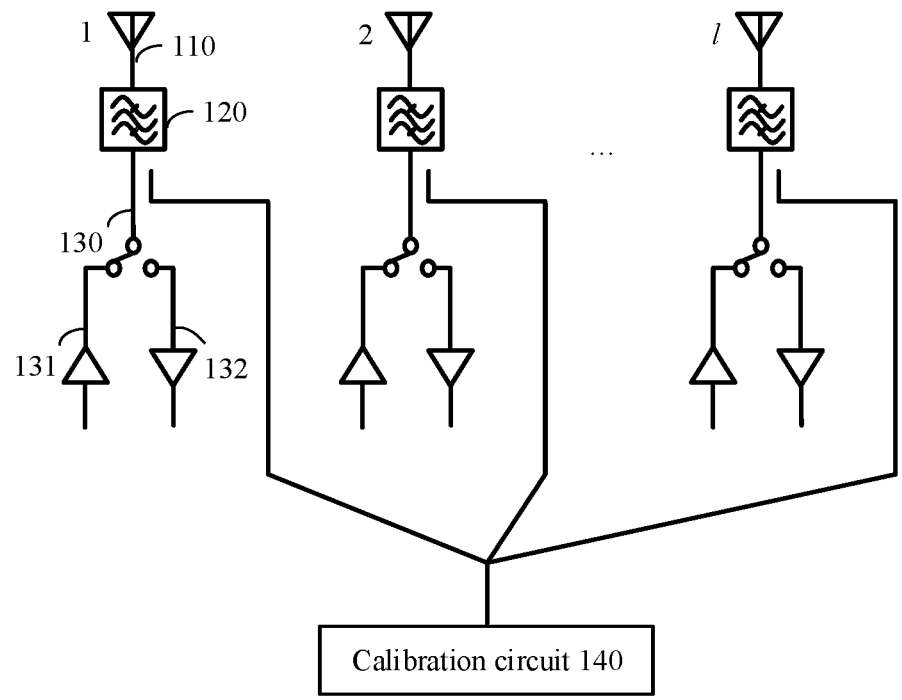
FIG. 1 is a schematic diagram of a structure of an antenna calibration apparatus according to an embodiment of this application.

FIG. 1 is a schematic block diagram of an antenna calibration apparatus 100 according to an embodiment of this application. As shown in FIG. 1, the antenna calibration apparatus 100 includes: l antennas 110, l antenna filters 120, l radio frequency links 130, and a calibration circuit 140, where l is an integer greater than or equal to 2.

As shown in FIG. 1, the l antennas 110 are respectively an antenna 1, an antenna 2, ..., and an antenna l. The l antennas 110 are respectively connected to the l antenna filters 120 (which are respectively an antenna filter 1, an antenna filter 2, ..., and an antenna filter l, and are not marked in the figure) and the l radio frequency links 130 (which are respectively a radio frequency link 1, a radio frequency link 2, ..., and a radio frequency link l, and are not marked in the figure), thereby forming l antenna channels. Further, the l radio frequency links 130 may include l radio frequency transmitter links 131 and l radio frequency receiver links 132, which respectively form l antenna transmitter channels and l antenna receiver channels with the l antennas and the l antenna filters.

In FIG. 1, the l antennas 110 are respectively connected to first ends of the l antenna filters 120, and the l radio frequency links 130 are respectively connected to second ends of the l antenna filters 120. Each of the second ends of the l antenna filters is connected to the calibration circuit 140. The antenna 1 is used as an example. The antenna 1 is connected to a first end of the antenna filter 1, a second end of the antenna filter 1 is connected to the radio frequency link 1, and the second end of the antenna filter 1 is further connected to the calibration circuit 140. Each of the second ends of the l antenna filters is connected to the calibration circuit 140.

It should be understood that the antenna may also be referred to as an antenna element, a feeder antenna, or another name; the antenna channel may also be referred to as a channel or another name; and the calibration circuit may also be referred to as an antenna calibration circuit or another name. This is not limited in this embodiment of this application.

It should be further understood that the antenna and the antenna filter belong to an antenna feeder unit, and the radio frequency link and the calibration circuit belong to a radio frequency unit. The antenna calibration coupling port is a connection port of the calibration circuit, and may also be referred to as an antenna calibration port or another name. In this embodiment of this application, as shown in FIG. 1, a position of the antenna calibration coupling port of each antenna is between the antenna filter and the radio frequency link. In this way, the calibration circuit 140 may send or receive a first calibration signal through the antenna calibration coupling port. In other words, the calibration circuit 140 may send or receive the first calibration signal through the position between the antenna filter and the radio frequency link connected to the second end of the antenna filter. The first calibration signal is a calibration signal generated in a running process of a live network.

According to the antenna calibration apparatus in this embodiment of this application, the position of the antenna calibration coupling port is arranged between the antenna filter and the radio frequency link. This enables the calibration circuit to directly send or receive a calibration signal through the radio frequency unit to perform antenna calibration, without adding components such as a cable, a connector, and a combiner unit. This simplifies an assembly technique of the antenna calibration apparatus, and helps reduce implementation costs of the antenna calibration apparatus.

For example, the calibration circuit may be specifically a printed circuit board (PCB), or may include another component, or may be integrated into a chip system. It should be understood that the calibration circuit may include an input circuit or interface configured to send a signal, and an output circuit or interface configured to receive a signal. Further, the calibration circuit may further include a memory and a processor, where the memory may store the signal obtained by the calibration circuit and a corresponding processing program, and the processor may perform calibration processing based on the processing program stored in the memory. Optionally, there may be one or more processors, and one or more memories. Optionally, the memory and the processor may be integrated together, or may be separately disposed. This is not limited in this embodiment of this application.

In addition, the antenna calibration apparatus may be any multi-antenna apparatus that can implement the foregoing functions. This is not limited in this embodiment of this application. In a possible implementation, the antenna calibration apparatus is a base station, for example, an evolved NodeB (eNB, or eNodeB) or a home base station (for example, home evolved NodeB, or home NodeB, HNB) in an LTE system, or gNB in a new radio (NR) system.

In an optional embodiment, the calibration circuit is specifically configured to: determine a first compensation parameter of each antenna in the l antennas; determine a second compensation parameter of each antenna based on the first compensation parameter and the first calibration signal; and calibrate each antenna based on the second compensation parameter.

It should be understood that, because the position of the antenna calibration coupling port is between the antenna filter and the radio frequency link, a signal sent or received by the calibration circuit may not pass through the antenna filter. An error (which may include, for example, a PCB cable error, a connector error, an antenna filter error, an antenna network error, or an antenna element error) of a link between the antenna and the antenna filter needs to be obtained through equipment tabling. In other words, the equipment tabling is intended to compensate for inconsistency of hardware links. In a production process of the apparatus, signal measurement is performed, and an obtained compensation parameter is stored in a memory (for example, a memory) for subsequent calibration. In this embodiment of this application, the compensation parameter in the equipment tabling process is referred to as the first compensation parameter. However, it should be understood that the first compensation parameter may also be referred to as an equipment tabling compensation parameter or another name. This is not limited in this embodiment of this application. Once the apparatus is delivered, the first compensation parameter is already stored. In a possible implementation, the first compensation parameter is stored in the memory in a form of a table (for example, an equipment table). However, this is not limited in this embodiment of this application.

According to the antenna calibration apparatus shown in FIG. 1, in an actual running process of the live network, the calibration circuit may obtain the first compensation parameter of each antenna from the memory, determine the second compensation parameter of each antenna based on the first compensation parameter and the first calibration signal obtained from the antenna calibration coupling port, and further calibrate the antenna by using the second compensation parameter. The second compensation parameter is a compensation parameter in the actual running process of the live network. The second compensation parameter may also be referred to as a calibration compensation parameter or another name. This is not limited in this embodiment of this application.

In an optional embodiment, the $i^{th}$ antenna in the l antennas is used as a reference antenna, and a first compensation parameter $\delta_j$ of the $j^{th}$ antenna in the l antennas meets:

$$\delta_j = \frac{1}{2}\left(\frac{a_i \times b_j}{a_j \times b_i} + \frac{c_i \times d_j}{c_j \times d_i}\right)$$

A radio frequency link corresponding to the $j^{th}$ antenna includes a receiver link and a transmitter link, the receiver link is connected to a receiver module, the transmitter link is connected to a transmitter module, the $j^{th}$ antenna is connected to an antenna used for testing, $a_j$ represents a second calibration signal received by the receiver module and sent by the antenna used for testing, $b_j$ represents a second calibration signal received by the receiver module and sent by the calibration circuit, $c_j$ represents a second calibration signal received by the antenna used for testing and sent by the transmitter module, $d_j$ represents a second calibration signal received by the calibration circuit and sent by the transmitter module, i is an integer and $1 \le i \le l$, and j is an integer ranging from 1 to l.

The second calibration signal is a calibration signal generated in the equipment tabling process. In the equipment tabling process, one or more equipment tabling antennas are required, which are also referred to as antennas used for testing in this specification. It should be understood that if there is only one equipment tabling antenna, a position of the equipment tabling antenna may be adjusted each time to sweep each antenna in the l antennas. In addition, one antenna needs to be selected from the l antennas as the reference antenna, to calculate an error between the reference antenna and another antenna. In this embodiment of this application, the $i^{th}$ antenna is the reference antenna.

In this embodiment of this application, it is assumed that $a_j=h_jC_jR_j$, $b_j=D_jR_j$, $c_j=T_jC_jh_j$, and $d_j=T_jD_j$. $h_j$ represents a coupling degree (also referred to as a coupling loss) between the $j^{th}$ antenna and the equipment tabling antenna. $C_j$ represents a system transmission function (which may include a PCB cable error, a connector error, an antenna filter error, an antenna network error, or an antenna element error existing after the transmitter link and the receiver link are combined) of a common part of the $j^{th}$ antenna. $R_j$ represents a transmission function of the receiver link corresponding to the $j^{th}$ antenna. $T_j$ represents a transmission function of the transmitter link corresponding to the $j^{th}$ antenna. $D_j$ represents a transmission function of a link between the $j^{th}$ antenna and the calibration circuit.

It should be understood that, $$\delta_j = \frac{1}{2}\left(\frac{a_i \times b_j}{a_j \times b_i} + \frac{c_i \times d_j}{c_j \times d_i}\right)$$

is equal to $$\delta_j = \frac{1}{2}\left(\frac{a_i b_j}{a_j b_i} + \frac{c_i d_j}{c_j d_i}\right).$$

"×" is omitted in the following embodiments for simplified description.

It should be further understood that, $$\delta_j = \frac{1}{2}\left(\frac{a_i \times b_j}{a_j \times b_i} + \frac{c_i \times d_j}{c_j \times d_i}\right)$$

does not mean absolute equation but equation satisfying a quantization range. "=" in this specification all refers to equation satisfying a quantization range. Details are not described again subsequently.

Figure 2:
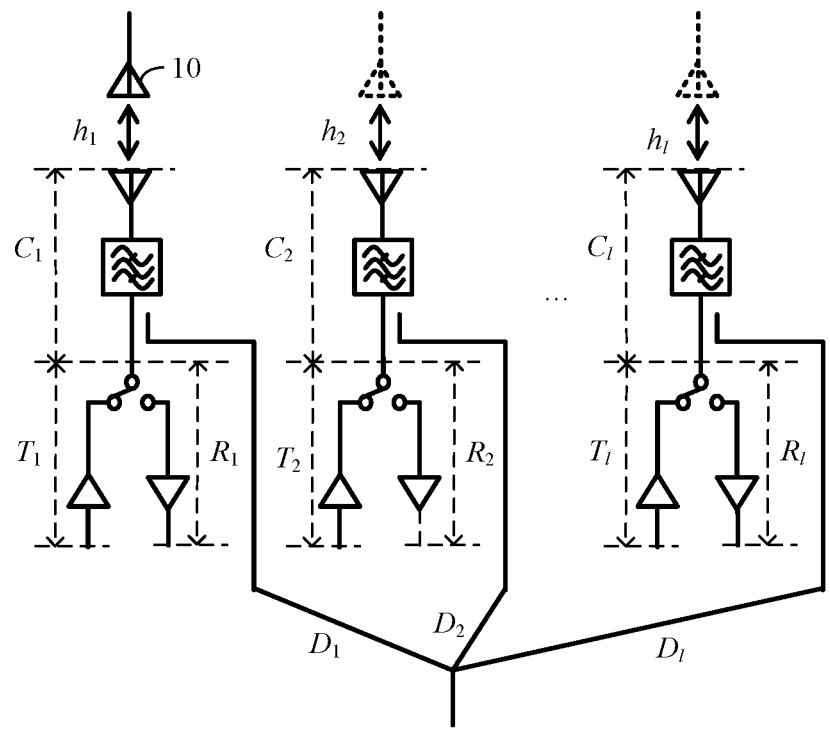
FIG. 2 is a schematic diagram of a structure of an antenna calibration apparatus in an equipment tabling process according to an embodiment of this application.

FIG. 2 shows an antenna calibration apparatus in an equipment tabling process. For example, an antenna 1 (that is, the first antenna) is a reference antenna. First, an equipment tabling antenna 10 performs sweeping to align with the antenna 1, and the following steps are performed:

The equipment tabling antenna 10 sends a second calibration signal, and a receiver module receives the second calibration signal and obtains a measurement result $a_1 = h_1 C_1 R_1$ (1).

A calibration circuit sends a second calibration signal through an antenna calibration coupling port, and the receiver module receives the second calibration signal and obtains a measurement result $b_1 = D_1 R_1$ (2).

A transmitter module sends a second calibration signal, and the equipment tabling antenna 10 receives the second calibration signal and obtains a measurement result $c_1 = T_1 C_1 h_1$ (3).

The transmitter module sends a second calibration signal, and the calibration circuit receives the second calibration signal through the antenna calibration coupling port and obtains a measurement result $d_1 = T_1 D_1$ (4).

Then, the equipment tabling antenna 10 performs sweeping to align with an antenna 2, and steps similar to the foregoing steps are performed to obtain measurement results $a_2 = h_2 C_2 R_2$ (5), $b_2 = D_2 R_2$ (6), $c_2 = T_2 C_2 h_2$ (7), and $d_2 = T_2 D_2$ (8).

$$\frac{C_1 R_1}{C_2 R_2} = \frac{h_2 a_1}{h_1 a_2} \tag{9}$$

may be obtained according to the foregoing formulas (1) and (5).

$$\frac{D_1 R_1}{D_2 R_2} = \frac{b_1}{b_2} \tag{10}$$

may be obtained according to the foregoing formulas (2) and (6).

$$\frac{T_1 C_1}{T_2 C_2} = \frac{h_2 c_1}{h_1 c_2} \tag{11}$$

may be obtained according to the foregoing formulas (3) and (7).

$$\frac{T_1 D_1}{T_2 D_2} = \frac{d_1}{d_2} \tag{12}$$

may be obtained according to the foregoing formulas (4) and (8).

Further, $$\frac{C_1 D_2}{C_2 D_1} = \frac{h_2 a_1 b_2}{h_1 a_2 b_1} \tag{13}$$

may be obtained according to the formulas (9) and (10).

$$\frac{C_1 D_2}{C_2 D_1} = \frac{h_2 c_1 d_2}{h_1 c_2 d_1} \tag{14}$$

may be obtained according to the formulas (11) and (12).

Therefore, according to the formulas (13) and (14), $$\delta_2 = \frac{C_1 D_2}{C_2 D_1} = \frac{h_2}{h_1} \times \frac{1}{2} \times \left(\frac{a_1 b_2}{a_2 b_1} + \frac{c_1 d_2}{c_2 d_1}\right) \approx \frac{1}{2}\left(\frac{a_1 b_2}{a_2 b_1} + \frac{c_1 d_2}{c_2 d_1}\right) \tag{15}$$

may be obtained, which represents a first compensation parameter of the antenna 2 relative to the antenna 1. In this embodiment, it is assumed that coupling degrees between the equipment tabling antenna and the antennas are equal, that is, $h_1 = h_2$.

By analogy, a first compensation parameter of each antenna relative to the antenna 1 in l antennas is calculated as follows:

$$\delta_j = \frac{1}{2}\left(\frac{a_i b_j}{a_j b_i} + \frac{c_i d_j}{c_j d_i}\right). \tag{16}$$

In this way, l first compensation parameters respectively corresponding to the l antennas are obtained, and are stored in a memory, for example, written into an equipment table.

It should be understood that an example in which the antenna 1 is used as the reference antenna is merely used above for description. In actual application, the reference antenna may be any one of the l antennas. In addition, only one equipment tabling antenna is used as an example in FIG. 2 to describe a process of successively performing equipment tabling on each of the l antennas. In another possible implementation, there may be more equipment tabling antennas. For example, there are l equipment tabling antennas. In this way, equipment tabling can be concurrently performed for all or some antennas in the l antennas, helping improve efficiency of equipment tabling.

In an optional embodiment, the first calibration signal includes $e_j$ and $f_j$. $e_j$ represents a calibration signal received by the calibration circuit and sent by a transmitter module corresponding to the $j^{th}$ antenna, and $f_j$ represents a calibration signal received by a receiver module corresponding to the $j^{th}$ antenna and sent by the calibration circuit. A second compensation parameter of the $j^{th}$ antenna includes a second compensation parameter $\tau_{T_j}$ of a transmitter link corresponding to the $j^{th}$ antenna and a second compensation parameter $\tau_{R_j}$ of a receiver link corresponding to the $j^{th}$ antenna. The $i^{th}$ antenna in the l antennas is used as the reference antenna, and the second compensation parameter $\tau_{T_j}$ of the transmitter link corresponding to the $j^{th}$ antenna in the l antennas meets:

$$\tau_{T_j} = \delta_j \times \frac{e_i}{e_j};$$

and the second compensation parameter $\tau_{R_j}$ of the receiver link corresponding to the $j^{th}$ antenna in the l antennas meets:

$$\tau_{R_j} = \delta_j \times \frac{f_i}{f_j}.$$

In an actual running process of a live network, a receiver channel and a transmitter channel of the antenna need to be calibrated separately. Therefore, the first calibration signal may include the calibration signal $e_j$ corresponding to the transmitter link and the calibration signal $f_j$ corresponding to the receiver link. Correspondingly, the second compensation parameter may include the compensation parameter $\tau_{T_j}$ corresponding to the transmitter link and the compensation parameter $\tau_{R_j}$ corresponding to the receiver link. The second compensation parameter may be obtained through calculation based on the first compensation parameter and the first calibration signal.

In this embodiment of this application, it is assumed that $e_j=T'_j D'_j$, and $f_j=D'_j R'_j$, where $R'_j$ represents a transmission function of the receiver link corresponding to the $j^{th}$ antenna during actual running, $T'_j$ represents a transmission function of the transmitter link corresponding to the $j^{th}$ antenna during actual running, and $D'_j$ represents a transmission function of a link between the $j^{th}$ antenna and the calibration circuit during actual running.

In an optional embodiment, the calibration circuit is configured to: obtain the first calibration signal $e_j$ and $f_j$ corresponding to each antenna; determine, based on the first compensation parameter $\delta_j$ of each antenna and the first calibration signal $e_j$ corresponding to each antenna, a second compensation parameter $\tau_{T_j}$ of a transmitter link corresponding to each antenna; determine, based on the first compensation parameter $\delta_j$ of each antenna and the first calibration signal $f_j$ corresponding to each antenna, a second compensation parameter $\tau_{R_j}$ of a receiver link corresponding to each antenna; and compensate for the transmitter link corresponding to each antenna with the second compensation parameter $\tau_{T_j}$ of the transmitter link corresponding to each antenna, and compensate for the receiver link corresponding to each antenna with the second compensation parameter $\tau_{R_j}$ of the receiver link corresponding to each antenna.

Refer to the example in which the antenna 1 (that is, the first antenna) is the reference antenna, as shown in FIG. 2. The following steps are performed to obtain the second compensation parameter corresponding to the transmitter link:

The transmitter module sends the first calibration signal, and the calibration circuit receives the first calibration signal through the antenna calibration coupling port and obtains measurement results $e_1=T'_1 D'_1$ (17) and $e_1=T'_j D'_j$ (18).

$$\sigma_{T_j} = \frac{T'_1 D'_1}{T'_i D'_i} = \frac{e_1}{e_j} \quad (19)$$

may be obtained according to the foregoing formulas (17) and (18).

A result of the first compensation parameter is multiplied by the foregoing formula (19), to obtain $$\tau_{T_j} = \delta_j \sigma_{T_j} = \frac{C_1 D_j}{C_j D_1} \times \frac{T'_1 D'_1}{T'_j D'_j} \approx \frac{T_1 C_1}{T_j C_j}, \quad (20)$$

which represents a second compensation parameter that is corresponding to the transmitter link and that is of the P h antenna relative to the antenna 1. In this embodiment, it is assumed that $T_j=T'_j$, and $D_j=D'_j$.

Similarly, the following steps are performed to obtain a second compensation parameter corresponding to the receiver link:

The calibration circuit sends the first calibration signal through the antenna calibration coupling port, and the receiver module receives the first calibration signal and obtains measurement results $f_1=D'_1 R'_1$ (21) and $f_j=D'_j R'_j$ (22).

$$\sigma_{R_j} = \frac{D'_1 R'_1}{D'_j R'_j} = \frac{f_1}{f_j} \quad (23)$$

may be obtained according to the foregoing formulas (21) and (22).

A result of the first compensation parameter is multiplied by the foregoing formula (23), to obtain $$\tau_{R_j} = \delta_j \sigma_{R_j} = \frac{C_1 D_j}{C_j D_1} \times \frac{D'_1 R'_1}{D'_j R'_j} \approx \frac{C_1 R_1}{C_j R_j}, \quad (24)$$

which represents a second compensation parameter that is corresponding to the receiver link and that is of the $j^{th}$ antenna relative to the antenna 1. In this embodiment, it is assumed that $D_j=D'_j$, and $C'_j=C'_j$.

Finally, the corresponding receiver link and transmitter link are respectively supplemented with the result of the formula (20) and the result of the formula (24), to complete antenna calibration.

It should be understood that the calibration of the receiver link and the calibration of the transmitter link are two independent calibration processes, and may be performed in sequence, or may be processed in parallel. This is not limited in this embodiment of this application.

In addition, the following condition 1 may be obtained according to the formulas (20) and (24):

$$T_1 C_1 = \delta_2 \sigma_{T_2} T_2 C_2 = \ldots = \delta_i \sigma_{T_i} T_i C_i \quad (25)$$

$$C_1 R_1 = \delta_2 \sigma_{R_2} C_2 R_2 = \ldots = \delta_i \sigma_{R_i} C_i R_i \quad (26)$$

The following condition 2 may be obtained by dividing (25) by (26):

$$\frac{T_1}{R_1} = \frac{\sigma_{T_2} T_2}{\sigma_{R_2} R_2} = \ldots = \frac{\sigma_{T_i} T_i}{\sigma_{R_i} R_i} \quad (27)$$

An error of equipment tabling (which may also be referred to as precision of equipment tabling) affects a value of $\delta_j$, which affects the condition 1 only and is unrelated to the condition 2. A calibration algorithm affects a value of $\sigma_j$, which affects both the condition 1 and the condition 2. In conclusion, the error of equipment tabling affects only forming precision of an open-loop beam, and has no impact on uplink and downlink reciprocity. Because impact of forming precision of the open-loop beam on a multi-antenna system is relatively weak, the antenna calibration apparatus in this embodiment of this application has a low requirement on precision of equipment tabling, which is likely to be met.

In the foregoing embodiment, frequency bands of the l antennas are the same, and all correspond to a first frequency band. This application does not exclude a case in which the antenna calibration apparatus further includes another frequency band. In other words, the antenna calibration apparatus is a multi-band multi-antenna channel.

In an optional embodiment, the l antennas correspond to the first frequency band, and the antenna calibration apparatus further includes: k antennas, corresponding to a second frequency band, where k is an integer greater than or equal to 2; k antenna filters, where first ends of the k antenna filters are respectively connected to the k antennas; and k radio frequency links, respectively connected to second ends of the k antenna filters. The calibration circuit is connected to each of the second ends of the k antenna filters, and is configured to: send or receive a third calibration signal through a position between each antenna filter in the k antenna filters and a radio frequency link connected to the second end of each antenna filter in the k antenna filters, and calibrate each antenna in the k antennas based on the third calibration signal.

The antenna calibration apparatus further includes the k antennas corresponding to the second frequency band. Similar to the first frequency band, in the case of the second frequency band, the k antennas are connected to the k antenna filters and the k radio frequency links, to form k antenna channels. Further, the k radio frequency links may include k radio frequency transmitter links and k radio frequency receiver links, which respectively form k antenna transmitter channels and k antenna receiver channels with the k antennas and k antenna filters. The k antennas are respectively connected to first ends of the k antenna filters, and the k radio frequency links are respectively connected to second ends of the k antenna filters. Each of the second ends of the k antenna filters is further connected to the calibration circuit. Similar to the first frequency band corresponding to the l antennas, in the case of the second frequency band, a position of an antenna calibration coupling port of each antenna in the k antennas is between the antenna filter and the radio frequency link. In this way, the calibration circuit may send or receive the third calibration signal through the antenna calibration coupling port. In other words, the calibration circuit 140 may send or receive the third calibration signal through the position between the antenna filter and the radio frequency link connected to the second end of the antenna filter. The third calibration signal is a calibration signal generated in the running process of the live network. For related descriptions of the k antennas in the second frequency band, refer to the descriptions of the l antennas in the first frequency band. Details are not described herein again.

In an optional embodiment, the calibration circuit is specifically configured to: determine a first compensation parameter of each antenna in the k antennas; determine a second compensation parameter of each antenna in the k antennas based on the first compensation parameter of each antenna in the k antennas and the third calibration signal; and calibrate each antenna in the k antennas based on the second compensation parameter of each antenna in the k antennas.

Similar to the first frequency band corresponding to the l antennas, in the second frequency band, equipment tabling also needs to be performed to obtain the first compensation parameter, and the first compensation parameter is written into the memory for subsequent calibration. In the second frequency band, an equipment tabling and calibration process of the k antennas is similar to the equipment tabling and calibration process in the first frequency band. Details are not described herein again.

According to the antenna calibration apparatus in this embodiment of this application, an assembly technique of the antenna calibration apparatus is simplified and implementation costs of the antenna calibration apparatus are reduced. In addition, antenna calibration of a multi-band and multi-antenna channel can be implemented, and development costs are further reduced.

In an optional embodiment, a reference antenna used to determine the first compensation parameter of each antenna in the k antennas is the $q^{th}$ antenna in the k antennas, q is an integer, and $1 \leq q \leq k$.

It should be understood that, in the equipment tabling and calibration process, the reference antenna needs to be selected. Reference antennas in frequency bands are different herein. To be specific, in the first frequency band, the reference antenna needs to be selected from the l antennas corresponding to the first frequency band; in the second frequency band, the reference antenna needs to be selected from the k antennas corresponding to the second frequency band.

Figure 3:
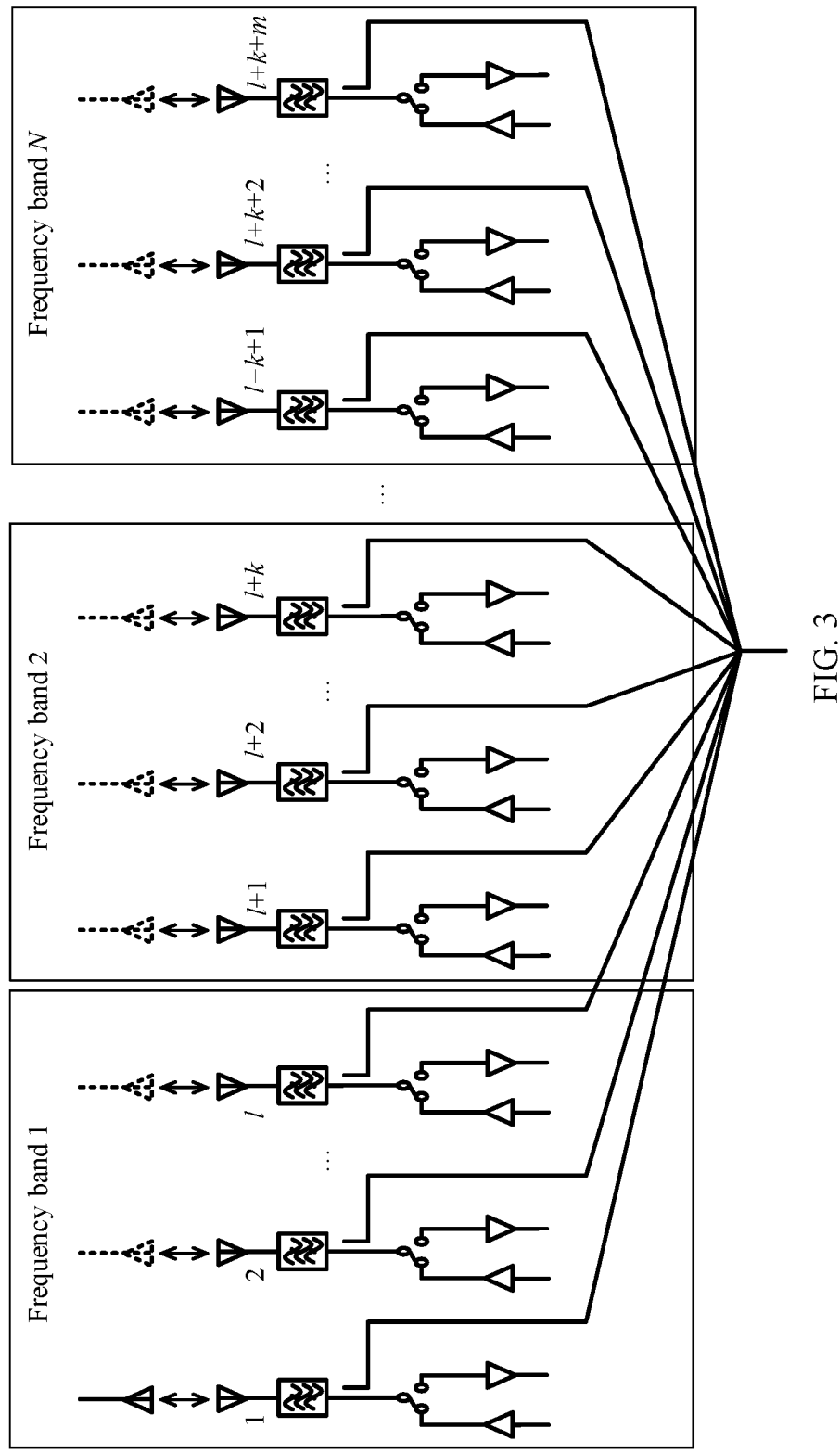
FIG. 3 is a schematic diagram of a structure of another antenna calibration apparatus in an equipment tabling process according to an embodiment of this application.

FIG. 3 is a schematic diagram of a structure of another antenna calibration apparatus in an equipment tabling process. The antenna calibration apparatus shown in FIG. 3 includes N frequency bands, and N is an integer greater than or equal to 2. The N frequency bands may include a same or different quantity of antennas. This is not limited in this embodiment of this application. A frequency band 1 corresponds to the foregoing first frequency band and includes l antennas. A frequency band 2 corresponds to the foregoing second frequency band and includes k antennas. In addition, the frequency band N includes m antennas, and m is an integer greater than or equal to 2.

In the example in FIG. 2, a reference antenna of the frequency band 1 is an antenna 1. According to the corresponding descriptions of FIG. 2, formulas (20) and (24), that is, a second compensation parameter, may be obtained. For example, a reference antenna of the frequency band 2 may be an antenna l+1, and a reference antenna of the frequency band N may be an antenna l+k+1. Like the frequency band 1, in the case of the second frequency band, a second compensation parameter corresponding to each frequency band may be obtained. Then, a corresponding receiver link and a corresponding transmitter link are compensated for with the second compensation parameter corresponding to each frequency band, so as to complete antenna calibration.

It should be understood that FIG. 3 shows only one equipment tabling antenna. A position of the equipment tabling antenna may be adjusted each time to sweep each antenna in l+k+m antennas. In another possible implementation, one or more equipment tabling antennas may be separately disposed for each frequency band, so that equipment tabling processes of all frequency bands can be performed in parallel. This helps improve efficiency of equipment tabling.

It should be further understood that a sequence of calibration processes of antennas in each of the frequency bands is not limited in this application. The calibration circuit may calibrate one antenna once obtaining a second compensation parameter corresponding to the antenna. Alternatively, after obtaining the second compensation parameters corresponding to all the antennas, the calibration circuit calibrates all the antennas together. This is not limited in this embodiment of this application.

The foregoing describes in detail the antenna calibration apparatus in the embodiments of this application with reference to FIG. 1 to FIG. 3. The following describes in detail an antenna calibration method in the embodiments of this application with reference to FIG. 4.

Figure 4:
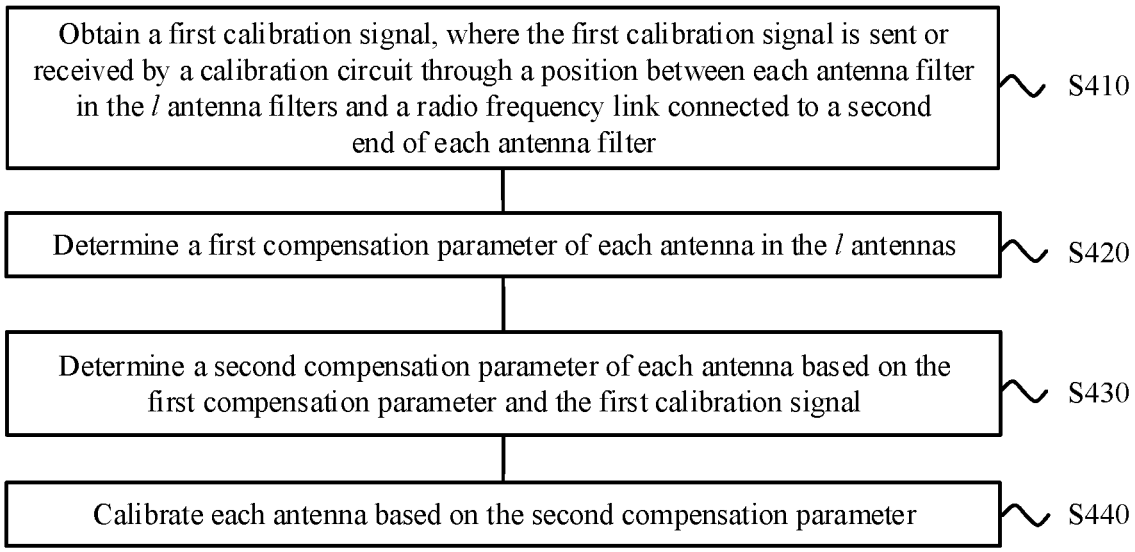
FIG. 4 is a schematic flowchart of an antenna calibration method according to an embodiment of this application.

FIG. 4 is a schematic flowchart of an antenna calibration method 400 according to this application. The method 400 is applied to an antenna calibration apparatus including l antennas. The l antennas are respectively connected to first ends of l antenna filters, and second ends of the l antenna filters are respectively connected to l radio frequency links and each connected to a calibration circuit. The method 400 includes the following steps:

S410: Obtain a first calibration signal, where the first calibration signal is sent or received by the calibration circuit through a position between each antenna filter in the l antenna filters and a radio frequency link connected to the second end of each antenna filter.

S420: Determine a first compensation parameter of each antenna in the l antennas.

S430: Determine a second compensation parameter of each antenna based on the first compensation parameter and the first calibration signal.

S440: Calibrate each antenna based on the second compensation parameter.

According to the antenna calibration method in this embodiment of this application, the position of the antenna calibration coupling port is arranged between the antenna filter and the radio frequency link. This enables the calibration circuit to directly send or receive a calibration signal through a radio frequency unit to perform antenna calibration, without adding components such as a cable, a connector, and a combiner unit. This simplifies an assembly technique of the antenna calibration apparatus, and helps reduce implementation costs of the antenna calibration apparatus.

The method 400 may be applied to the antenna calibration apparatus shown in FIG. 1 to FIG. 3. However, this embodiment of this application is not limited thereto. For a specific calibration process, refer to the related descriptions of the foregoing antenna calibration apparatus. Details are not described herein again.

In an optional embodiment, the $i^{th}$ antenna in the l antennas is used as a reference antenna, and a first compensation parameter $\delta_j$ of the $j^{th}$ antenna in the l antennas meets $$\delta_j = \frac{1}{2}\left(\frac{a_i \times b_j}{a_j \times b_i} + \frac{c_i \times d_j}{c_j \times d_i}\right).$$

A radio frequency link corresponding to the $j^{th}$ antenna includes a receiver link and a transmitter link, the receiver link is connected to a receiver module, the transmitter link is connected to a transmitter module, the $j^{th}$ antenna is connected to an antenna used for testing, $a_j$ represents a second calibration signal received by the receiver module and sent by the antenna used for testing, $b_j$ represents a second calibration signal received by the receiver module and sent by the calibration circuit, $c_j$ represents a second calibration signal received by the antenna used for testing and sent by the transmitter module, $d_j$ represents a second calibration signal received by the calibration circuit and sent by the transmitter module, i is an integer and 1≤i≤l, and j is an integer ranging from 1 to l.

In an optional embodiment, the first calibration signal includes $e_j$ and $f_j$. $e_j$ represents a calibration signal received by the calibration circuit and sent by a transmitter module corresponding to the $j^{th}$ antenna, and $f_j$ represents a calibration signal received by a receiver module corresponding to the $j^{th}$ antenna and sent by the calibration circuit. A second compensation parameter of the $j^{th}$ antenna includes a second compensation parameter $\tau_{T_j}$ of a transmitter link corresponding to the $j^{th}$ antenna and a second compensation parameter $\tau_{R_j}$ of a receiver link corresponding to the $j^{th}$ antenna. The $i^{th}$ antenna in the l antennas is used as the reference antenna, and the second compensation parameter $\tau_{T_j}$ of the transmitter link corresponding to the $j^{th}$ antenna in the l antennas meets:

$$\tau_{T_j} = \delta_j \times \frac{e_i}{e_j};$$

and the second compensation parameter $\tau_{R_j}$ of the receiver link corresponding to the $j^{th}$ antenna in the l antennas meets:

$$\tau_{R_j} = \delta_j \times \frac{f_i}{f_j}.$$

In an optional embodiment, the obtaining a first calibration signal includes: obtaining the first calibration signal $e_j$ and $f_j$ corresponding to each antenna. The determining a second compensation parameter of each antenna based on the first compensation parameter and the first calibration signal includes: determining, based on the first compensation parameter $\delta_j$ of each antenna and the first calibration signal $e_j$ corresponding to each antenna, a second compensation parameter $\tau_{T_j}$ of a transmitter link corresponding to each antenna; and determining, based on the first compensation parameter $\delta_j$ of each antenna and the first calibration signal $f_j$ corresponding to each antenna, a second compensation parameter $\tau_{R_j}$ of a receiver link corresponding to each antenna. The calibrating each antenna based on the second compensation parameter includes: compensating for the transmitter link corresponding to each antenna with the second compensation parameter $\tau_{T_j}$ of the transmitter link corresponding to each antenna, and compensating for the receiver link corresponding to each antenna with the second compensation parameter $\tau_{R_j}$ of the receiver link corresponding to each antenna.

In an optional embodiment, the l antennas correspond to a first frequency band, and the antenna calibration apparatus further includes k antennas corresponding to a second frequency band, where k is an integer greater than or equal to 2. The k antennas are respectively connected to first ends of k antenna filters, and second ends of the k antenna filters are respectively connected to k radio frequency links and each connected to the calibration circuit. The method further includes: obtaining a third calibration signal, where the third calibration signal is sent or received by the calibration circuit through a position between each antenna filter in the k antenna filters and a radio frequency link connected to the second end of each antenna filter in the k antenna filters;

determining a first compensation parameter of each antenna in the k antennas; determining a second compensation parameter of each antenna in the k antennas based on the first compensation parameter of each antenna in the k antennas and the third calibration signal; and calibrating each antenna in the k antennas based on the second compensation parameter of each antenna in the k antennas.

In an optional embodiment, a reference antenna used to determine the first compensation parameter of each antenna in the k antennas is the $q^{th}$ antenna in the k antennas, q is an integer, and $1 \leq q \leq k$.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

In this application, "at least one" means one or more, and "a plurality of" means two or more. "And/or" describes an association relationship of associated objects, and indicates that three relationships may exist. For example, A and/or B may indicate the following cases: Only A exists; both A and B exist, or only B exists, where A and B may be singular or plural. The character "/" generally indicates that associated objects are in an "or" relationship. "At least one item (piece) of the following" or a similar expression thereof means any combination of these items and includes any combination of a single item (piece) or a plurality of items (pieces). For example, at least one item (piece) of a, b, or c may indicate a, b, c, a and b, a and c, b and c, or a, b, and c, where a, b, and c may be singular or plural.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected depending on actual requirements to achieve the objectives of the solutions in the embodiments.

In addition, functional units in the embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions in this application essentially, or a part contributing to an existing technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna calibration apparatus, comprising:
   l antennas, wherein l is an integer greater than or equal to 2;
   l antenna filters, wherein first ends of the l antenna filters are respectively connected to the l antennas;
   l radio frequency links, respectively connected to second ends of the l antenna filters; and
   a calibration circuit, connected to each of the second ends of the l antenna filters, and configured to: send or receive a first calibration signal through a position between each antenna filter in the l antenna filters and a radio frequency link connected to the second end of each antenna filter in the l antenna filters; and calibrate each antenna in the l antennas based on the first calibration signal.

2. The apparatus according to claim 1, wherein the calibration circuit is configured to:
   determine a first compensation parameter of each antenna of the l antennas;
   determine a second compensation parameter of each antenna of the l antennas based on the first compensation parameter and the first calibration signal; and
   calibrate each antenna of the l antennas based on the second compensation parameter.

3. The apparatus according to claim 2, wherein the $i^{th}$ antenna in the l antennas is used as a reference antenna, and a first compensation parameter $\delta_j$ of the $j^{th}$ antenna in the l antennas satisfies:

$$\delta_j = \frac{1}{2}\left(\frac{a_i \times b_j}{a_j \times b_i} + \frac{c_i \times d_j}{c_j \times d_i}\right),$$

wherein
- a radio frequency link corresponding to the $j^{th}$ antenna comprises a receiver link and a transmitter link, the receiver link is connected to a receiver module, the transmitter link is connected to a transmitter module, the $j^{th}$ antenna is connected to an antenna used for testing, $a_j$ represents a second calibration signal received by the receiver module and sent by the antenna used for testing, $b_j$ represents a second calibration signal received by the receiver module and sent by the calibration circuit, $c_j$ represents a second calibration signal received by the antenna used for testing and sent by the transmitter module, $d_j$ represents a second calibration signal received by the calibration circuit and sent by the transmitter module, i is an integer and $1 \leq i \leq l$, and j is an integer ranging from 1 to l.

4. The apparatus according to claim 3, wherein the first calibration signal comprises $e_j$ and $f_j$, $e_j$ represents a calibration signal received by the calibration circuit and sent by a transmitter module corresponding to the $j^{th}$ antenna, and $f_j$ represents a calibration signal received by a receiver module corresponding to the $j^{th}$ antenna and sent by the calibration circuit;
- a second compensation parameter of the $j^{th}$ antenna comprises a second compensation parameter $\tau_{T_j}$ of a transmitter link corresponding to the $j^{th}$ antenna and a second compensation parameter $\tau_{R_j}$ of a receiver link corresponding to the $j^{th}$ antenna;
- the $i^{th}$ antenna in the l antennas is used as the reference antenna, and the second compensation parameter $\tau_{T_j}$ of the transmitter link corresponding to the $j^{th}$ antenna in the l antennas satisfies:

$$\tau_{T_j} = \delta_j \times \frac{e_i}{e_j};$$

and
the second compensation parameter $\tau_{R_j}$ of the receiver link corresponding to the $j^{th}$ antenna in the l antennas satisfies:

$$\tau_{R_j} = \delta_j \times \frac{f_i}{f_j}.$$

5. The apparatus according to claim 4, wherein the calibration circuit is configured to:
- obtain the first calibration signal $e_j$ and $f_j$ corresponding to each antenna of the l antennas;
- determine, based on the first compensation parameter $\delta_j$ of each antenna of the l antennas and the first calibration signal $e_j$ corresponding to each antenna of the l antennas, a second compensation parameter $\tau_{T_j}$ of a transmitter link corresponding to each antenna of the l antennas;
- determine, based on the first compensation parameter $\delta_j$ of each antenna of the l antennas and the first calibration signal $f_j$ corresponding to each antenna of the l antennas, a second compensation parameter $\tau_{R_j}$ of a receiver link corresponding to each antenna of the l antennas; and
- compensate for the transmitter link corresponding to each antenna of the l antennas with the second compensation parameter $\tau_{T_j}$ of the transmitter link corresponding to each antenna of the l antennas, and compensate for the receiver link corresponding to each antenna of the l antennas with the second compensation parameter $\tau_{R_j}$ of the receiver link corresponding to each antenna of the l antennas.

6. The apparatus according to claim 1, wherein the l antennas correspond to a first frequency band, and the apparatus further comprises:
- k antennas, corresponding to a second frequency band, wherein k is an integer greater than or equal to 2;
- k antenna filters, wherein first ends of the k antenna filters are respectively connected to the k antennas; and
- k radio frequency links, respectively connected to second ends of the k antenna filters, wherein
- the calibration circuit is connected to each of the second ends of the k antenna filters, and is configured to:
- send or receive a third calibration signal through a position between each antenna filter in the k antenna filters and a radio frequency link connected to the second end of each antenna filter in the k antenna filters, and calibrate each antenna in the k antennas based on the third calibration signal.

7. The apparatus according to claim 6, wherein the calibration circuit is configured to:
- determine a first compensation parameter of each antenna in the k antennas;
- determine a second compensation parameter of each antenna in the k antennas based on the first compensation parameter of each antenna in the k antennas and the third calibration signal; and
- calibrate each antenna in the k antennas based on the second compensation parameter of each antenna in the k antennas.

8. The apparatus according to claim 7, wherein a reference antenna used to determine the first compensation parameter of each antenna in the k antennas is the $q^{th}$ antenna in the k antennas, q is an integer, and $1 \leq q \leq k$.

9. An antenna calibration method, applied to an antenna calibration apparatus comprising l antennas, wherein the l antennas are respectively connected to first ends of l antenna filters, second ends of the l antenna filters are respectively connected to l radio frequency links and each of the second ends of the l antenna filters is connected to a calibration circuit, and the method comprises:
- obtaining a first calibration signal, wherein the first calibration signal is sent or received by the calibration circuit through a position between each antenna filter in the l antenna filters and a radio frequency link connected to the second end of each antenna filter in the l antenna filters;
- determining a first compensation parameter of each antenna in the l antennas;
- determining a second compensation parameter of each antenna in the l antennas based on the first compensation parameter and the first calibration signal; and
- calibrating each antenna in the l antennas based on the second compensation parameter.

10. The method according to claim 9, wherein the $i^{th}$ antenna in the l antennas is used as a reference antenna, and a first compensation parameter $\delta_j$ of the $j^{th}$ antenna in the l antennas satisfies:

$$\delta_j = \frac{1}{2}\left(\frac{a_i \times b_j}{a_j \times b_i} + \frac{c_i \times d_j}{c_j \times d_i}\right);$$

and a radio frequency link corresponding to the $j^{th}$ antenna comprises a receiver link and a transmitter link, the receiver link is connected to a receiver module, the transmitter link is connected to a transmitter module, the $j^{th}$ antenna is connected to an antenna used for testing, $a_j$ represents a second calibration signal received by the receiver module and sent by the antenna used for testing, $b_j$ represents a second calibration signal received by the receiver module and sent by the calibration circuit, $c_j$ represents a second calibration signal received by the antenna used for testing and sent by the transmitter module, $d_j$ represents a second calibration signal received by the calibration circuit and sent by the transmitter module, i is an integer and $1 \le i \le l$, and j is an integer ranging from 1 to l.

11. The method according to claim 10, wherein the first calibration signal comprises $e_j$ and $f_j$, $e_j$ represents a calibration signal received by the calibration circuit and sent by a transmitter module corresponding to the $j^{th}$ antenna, and $f_j$ represents a calibration signal received by a receiver module corresponding to the j antenna and sent by the calibration circuit;

a second compensation parameter of the $j^{th}$ antenna comprises a second compensation parameter $\tau_{T_j}$ of a transmitter link corresponding to the $j^{th}$ antenna and a second compensation parameter $\tau_{R_j}$ of a receiver link corresponding to the $j^{th}$ antenna;

the $i^{th}$ antenna in the l antennas is used as the reference antenna, and the second compensation parameter $\tau_{T_j}$ of the transmitter link corresponding to the $j^{th}$ antenna in the l antennas satisfies:

$$\tau_{T_j} = \delta_j \times \frac{e_i}{e_j};$$

and the second compensation parameter $\tau_{R_j}$ of the receiver link corresponding to the $j^{th}$ antenna in the l antennas satisfies:

$$\tau_{R_j} = \delta_j \times \frac{f_i}{f_j}.$$

12. The method according to claim 11, wherein the obtaining a first calibration signal comprises:
obtaining the first calibration signal $e_j$ and $f_j$ corresponding to each antenna in the l antennas;
the determining a second compensation parameter of each antenna in the l antennas based on the first compensation parameter and the first calibration signal comprises:

determining, based on the first compensation parameter $\delta_j$ of each antenna in the l antennas and the first calibration signal $e_j$ corresponding to each antenna in the l antennas, a second compensation parameter $\tau_{T_j}$ of a transmitter link corresponding to each antenna in the l antennas; and determining, based on the first compensation parameter g i of each antenna in the l antennas and the first calibration signal f corresponding to each antenna in the l antennas, a second compensation parameter $\tau_{R_j}$ of a receiver link corresponding to each antenna in the l antennas; and the calibrating each antenna based on the second compensation parameter comprises:

compensating for the transmitter link corresponding to each antenna in the l antennas with the second compensation parameter $\tau_{T_j}$ of the transmitter link corresponding to each antenna in the l antennas, and compensating for the receiver link corresponding to each antenna in the l antennas with the second compensation parameter $\tau_{R_j}$ of the receiver link corresponding to each antenna in the l antennas.

13. The method according to claim 9, wherein the l antennas correspond to a first frequency band, and the antenna calibration apparatus further comprises k antennas corresponding to a second frequency band, wherein k is an integer greater than or equal to 2, the k antennas are respectively connected to first ends of k antenna filters, and second ends of the k antenna filters are respectively connected to k radio frequency links and each of the second ends of the k antenna filters is connected to the calibration circuit; and the method further comprises:
obtaining a third calibration signal, wherein the third calibration signal is sent or received by the calibration circuit through a position between each antenna filter in the k antenna filters and a radio frequency link connected to the second end of each antenna filter in the k antenna filters;
determining a first compensation parameter of each antenna in the k antennas;
determining a second compensation parameter of each antenna in the k antennas based on the first compensation parameter of each antenna in the k antennas and the third calibration signal; and
calibrating each antenna in the k antennas based on the second compensation parameter of each antenna in the k antennas.

14. The method according to claim 13, wherein a reference antenna used to determine the first compensation parameter of each antenna in the k antennas is the $q^{th}$ antenna in the k antennas, q is an integer, and $1 \le q \le k$.

* * * * *

UNITED STATES PATENT AND TRADEMARK OFFICE
CERTIFICATE OF CORRECTION

PATENT NO. : 12,028,118 B2
APPLICATION NO. : 17/682861
DATED : July 2, 2024
INVENTOR(S) : Chen et al.

It is certified that error appears in the above-identified patent and that said Letters Patent is hereby corrected as shown below:

In the Claims

Claim 11: Column 23, Line 22: reads as "corresponding to the j antenna and sent by the calibration" should read as -- corresponding to the $j^{th}$ antenna and sent by the calibration --.

Claim 12: Column 24, Lines 7-9: read as "determining, based on the first compensation parameter gi of each antenna in the l antennas and the first calibration signal f corresponding to each antenna in" should read as -- determining, based on the first compensation parameter $\delta_j$ of each antenna in the l antennas and the first calibration signal $f_i$ corresponding to each antenna in --.

Signed and Sealed this
Twenty-second Day of April, 2025

Coke Morgan Stewart
*Acting Director of the United States Patent and Trademark Office*